(12) United States Patent
Lopez et al.

(10) Patent No.: US 10,202,289 B1
(45) Date of Patent: Feb. 12, 2019

(54) METHOD AND APPARATUS FOR TREATING PRODUCTION WATER

(71) Applicants: Noe Joshua Lopez, Bentonville, AR (US); Joshua Decker, Dallas, TX (US)

(72) Inventors: Noe Joshua Lopez, Bentonville, AR (US); Joshua Decker, Dallas, TX (US)

(*) Notice: Subject to any disclaimer, the term of this patent is extended or adjusted under 35 U.S.C. 154(b) by 442 days.

(21) Appl. No.: 14/965,355

(22) Filed: Dec. 10, 2015

Related U.S. Application Data (62) Division of application No. 13/668,150, filed on Nov. 2, 2012.

(51) Int. Cl.
| | |
|---|---|
| *C02F 1/40* | (2006.01) |
| *B01D 21/00* | (2006.01) |
| *B01D 21/02* | (2006.01) |
| *B01D 21/30* | (2006.01) |
| *C02F 1/463* | (2006.01) |
| *C02F 9/00* | (2006.01) |
| *C02F 1/52* | (2006.01) |
| *C02F 1/46* | (2006.01) |
| *B01D 21/24* | (2006.01) |
| *C02F 1/00* | (2006.01) |
| *C02F 101/32* | (2006.01) |
| *B01D 35/027* | (2006.01) |
| *B01D 21/01* | (2006.01) |

(52) U.S. Cl.
CPC ............ *C02F 1/40* (2013.01); *B01D 21/0018* (2013.01); *B01D 21/0039* (2013.01); *B01D 21/0087* (2013.01); *B01D 21/02* (2013.01); *B01D 21/30* (2013.01); *C02F 1/46* (2013.01); *C02F 1/463* (2013.01); *C02F 1/52* (2013.01); *C02F 9/00* (2013.01); *B01D 21/0015* (2013.01); *B01D 21/01* (2013.01); *B01D 21/24* (2013.01); *B01D 35/027* (2013.01); *C02F 2001/007* (2013.01); *C02F 2101/32* (2013.01); *C02F 2201/008* (2013.01)

(58) Field of Classification Search
None
See application file for complete search history.

(56) References Cited

U.S. PATENT DOCUMENTS

| | | | |
|---|---|---|---|
| 6,506,310 B2 * | 1/2003 | Kulbeth | B01D 21/0018 175/206 |
| 2009/0065442 A1 * | 3/2009 | Taylor | C02F 1/008 210/723 |

(Continued)

*Primary Examiner* — Clare M Perrin
(74) *Attorney, Agent, or Firm* — John R Casperson (57) ABSTRACT

Method and apparatus are provided for treating salt water. In the method, a feed water is run through a skimmer unit to form de-oiled water. The de-oiled water is passed through an electrocoagulation unit to form electrocoagulated water. A precipitating agent is added to the electrocoagulated water and stirred to form a water/floc mixture. A polymeric coagulation enhancing agent is added to the water/floc mixture with mild stirring and coagulants in the mixture are permitted to settle. A partly clarified water from the mixture is drawn out from a level above the settled coagulants. The partly clarified water is run through at least one settler and coagulants are removed from the bottom of the at least one settler. A clarified salt water stream is withdrawn from the final settler. The necessary equipment can be mounted on a trailer. The trailer can be provided with a stairway and catwalk to facilitate safe inspection.

14 Claims, 6 Drawing Sheets

(56) References Cited

U.S. PATENT DOCUMENTS

| | | | |
|---|---|---|---|
| 2010/0307975 A1* | 12/2010 | Johnson | C02F 9/00 210/652 |
| 2011/0155564 A1* | 6/2011 | Oifman | B01D 21/0003 204/230.2 |
| 2011/0233136 A1* | 9/2011 | Enos | C02F 9/00 210/631 |
| 2011/0257788 A1* | 10/2011 | Wiemers | B01D 61/022 700/267 |
| 2011/0297552 A1* | 12/2011 | Boyle | C02F 1/463 205/742 |
| 2012/0145647 A1* | 6/2012 | Volkel | C02F 1/463 210/738 |
| 2012/0325744 A1* | 12/2012 | Polizzotti | C02F 9/00 210/638 |
| 2013/0161262 A1* | 6/2013 | Henley | C02F 9/00 210/695 |

* cited by examiner

METHOD AND APPARATUS FOR TREATING PRODUCTION WATER

FIELD OF THE INVENTION

This invention relates to a method for treating water utilizing the steps of oil skimming, electrostatic coagulation and chemical precipitation, and apparatus well suited for conducting the method.

BACKGROUND OF THE INVENTION

The problem of dealing with waste water is especially acute in the oil and gas industry. Drilling and completing oil and gas wells requires injecting fluid materials including thousands of barrels of water. A fracking operation requires injecting frack fluids which may include hundreds of thousands of barrels of water. Workover operations often require injecting hundreds of barrels of kill fluids, which are primarily made up of water. Much of the injected water from drilling, completion, workover and fracking operations is later recovered as flowback water at the wellhead, creating a large scale waste water disposal problem.

Additionally, once a well is in a production mode, much of the produced volume from the well is typically in the form of salt water which must be separated out and trucked away for treatment or disposal.

As water trucks going to and from the well site can only carry approximately a hundred barrels of water, it will be appreciated from the forgoing that drilling and operating an oil well requires hundreds of truck trips to haul the water. Additionally, water brought to the site has to be paid for, and treatment or disposal fees have to be paid for water hauled away from the site. Costs go up as the trucking distances for the water increase.

A device compact enough to be located near the wellhead for cleaning flowback and produced water adequately to permit its further use would be very desirable, as it would greatly reduce the amount of water that would have to be otherwise trucked in and out, and/or the costs associated with acquiring, transporting, treating or disposing of the water.

It is an object of this invention to provide such a device.

SUMMARY OF THE INVENTION

One embodiment of the invention provides a method of treating salt water to remove materials that render it undesirable for further uses. According to the method, the incoming salt water stream is skimmed, electrocoagulated, and chemically treated to form a supernatant suitable for further uses. The method is carried out by treating the salt water in a skimmer/settler unit to remove, as an upper stream, oil and other water insolubles having a density less than the salt water, and, as a lower stream, particulates having a density greater than the salt water. A middle stream is withdrawn from the skimmer/settler unit run through an electrocoagulation unit to form electrocoagulated salt water. A precipitating agent is added to the electrocoagulated salt water and mixed to form a salt water/floc mixture. A polymeric coagulating agent is added to the salt water/floc mixture with stirring and coagulants in the mixture are permitted to settle in a mixer/settler vessel. A partly clarified salt water stream is withdrawn from the mixture from a level above the settled coagulants. The partly clarified salt water stream is passed through at least one settler and further clarified overflow is withdrawn from each at least one settler. The desired clarified salt water stream with withdrawn as overflow from a final settler.

The just described method can be carried out in an apparatus comprising a skimmer-settler, an electrocoagulation unit receiving a middle draw from the skimmer-settler, a mixer-settler receiving output from the electrocoagulation unit, and at least one settler receiving overflow from the mixer-settler.

The just described apparatus can be constructed on a single road-transportable trailer or skid. In another embodiment of the invention, there is provided an apparatus comprising a trailer frame, first, second and third upright tanks, an electrocoagulation unit, and a fourth tank used as a skimmer separator unit.

The trailer frame has a front end and a back end with a fifth wheel coupler at its front end and at least one axle with at least two wheels near the back end. Preferably, the trailer frame has at least one jack near the front end to raise and lower the coupler. A first upright tank, a second upright tank, and a third upright tank are mounted serially in a line on a top side of the trailer frame, with the third tank being positioned near the back end of the trailer frame. A stirrer extends into the first tank from the upper end of the tank generally along the longitudinal axis. The stirrer has a fan-shaped screw impeller. A variable speed driver is connected to the stirrer, for rotating the stirrer to pull fluid from the bottom of the tank. The variable speed driver is mounted to the trailer frame by support means. A set of three parallel weir walls is positioned in at least the first tank, to divide the first tank into first and second downcomer sections and first and second riser sections. The first downcomer section is positioned nearest the front end of the trailer, the second riser section is positioned nearest the back end of the trailer, the first riser section is positioned adjacent to the first downcomer section and contains the fan-shaped impeller, and the second downcomer section is positioned between the first riser section and the second riser section. A wall forming the middle weir has an upper end surface that is lower than a peripheral lip defining the top of the first tank and a lower end surface that is spaced above the bottom of the first tank, so that fluid upwells centrally in the first riser section, spills over the upper end of the middle weir wall and flows through the second downcomer to the bottom of the tank. A portion of the fluid flows upwardly in the second riser section. Each tank has an inlet and an outlet near the upper end of the tank. The inlet faces the front end of the trailer frame and outlet faces the back end of the trailer frame. The outlet of the first tank is in flow communication with the inlet of the second tank, and the outlet of the second tank is in flow communication with the inlet of the third tank. The outlet of the first tank is positioned higher than the inlet to a second tank, and the outlet of the second tank is positioned higher than the inlet to the third tank, so that fluid will flow by gravity from the first tank to the second tank to the third tank. The fourth tank is positioned at the front end of the trailer and contains an oil skimmer. A control room is positioned between the fourth tank and the first tank and the electrocoagulation unit is positioned in the control room. The electrocoagulation unit is positioned to draw from the fourth tank and to discharge though a flow path to the first tank. An inline mixer is also positioned in the control room in the flow path between the electrocoaguation unit and the first tank.

To provide easy and safe inspection of the just described apparatus, in one embodiment of the invention the trailer is provided with a frame and a catwalk hingedly connected to the frame and extending longitudinally from the back end to near the front end of the trailer. The catwalk, when in a deployed position, extends generally horizontally laterally outwardly from the longitudinal axis of the trailer. To provide easy and safe access to the just described device, the trailer is in one embodiment is provided with a diagonally extending stairway at the back end.

DETAILED DESCRIPTION OF THE INVENTION

One embodiment of the invention provides a method of treating salt water to remove materials that render it undesirable for further uses. The salt water will typically contain oil, suspended solids and dissolved solids. Oil field salt waters to be treated in accordance with the invention will typically comprise dissolved solids of Group I and Group II metal halides and suspended solids which may be selected from Group II metal sulfates, iron compounds and colloidal materials. Often, the feed stream will further comprise materials selected from the group consisting of sand, hydrogen sulfide, oil, bacteria and heavy metals.

Figure 1:
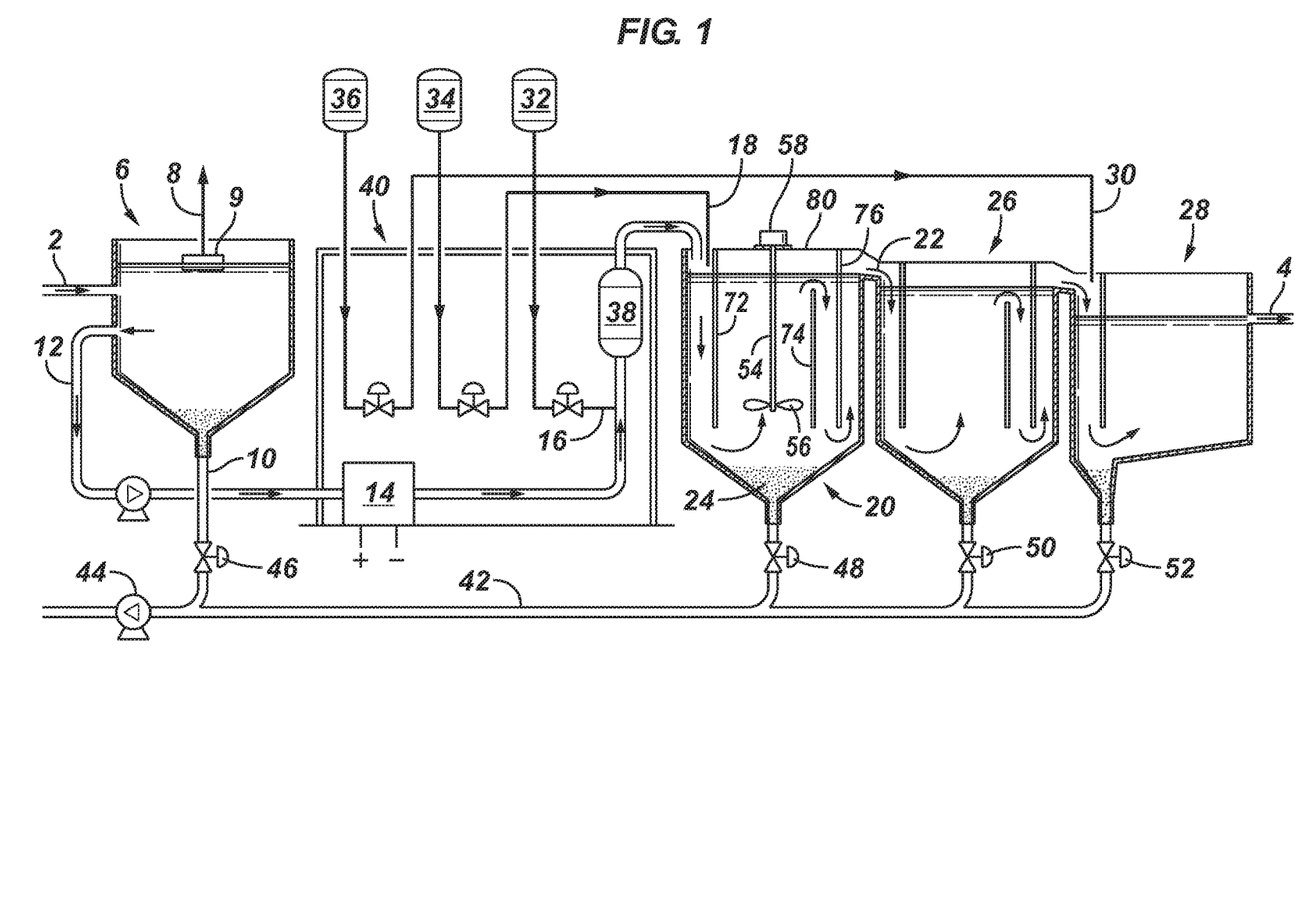
FIG. 1 is a side view, partly in schematic, showing certain features of an embodiment of the invention.
Figure 2:
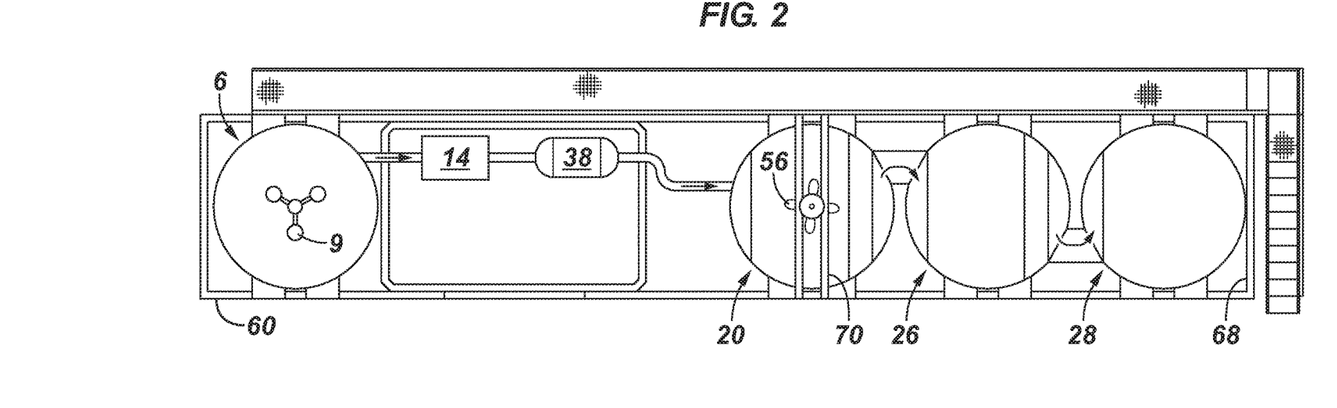
FIG. 2 is a plan view, partly in schematic, showing certain features of an embodiment of the invention.

According to the method, the incoming salt water stream 2 is skimmed, electrocoagulated, chemically treated and settled to form a supernatant stream 4 suitable for further uses. The method is carried out by treating the salt water in a skimmer/settler unit 6 to remove, as an upper stream 8, oil and other water insolubles having a density less than the salt water, and, as a lower stream 10, particulates having a density greater than the salt water. A middle stream 12, which has been deoiled, is withdrawn from the skimmer/settler unit by a pump and run through an electrocoagulation unit 14 to form electrocoagulated salt water, which typically contains precipitate and dissolved solids. A precipitating agent 16 is added to the electrocoagulated salt water and mixed to form a salt water/floc mixture. A polymeric coagulating agent 18 is added to the salt water/floc mixture with stirring and coagulants in the mixture are permitted to settle in a mixer/settler vessel 20. A partly clarified salt water stream 22 is withdrawn from the mixture from a level above the settled coagulants 24. The partly clarified salt water stream is passed through at least one settler 26 and further clarified overflow is withdrawn from each at least one settler. The desired clarified salt water stream is withdrawn as overflow from a final settler 28.

The precipitating agent is, generally speaking, a basifier, which raises pH, preferably to within the range of 9 to 11 in the mixer settler. The precipitating agent is preferably selected from the group consisting of sodium hydroxide, ammonium hydroxide, and potassium hydroxide since cation salts formed from these materials are soluble. Sodium hydroxide is preferred. The pH in the mixer settler is preferably maintained in the range of 9 to 11, preferably in the range of 9.5 to 10.2, as this causes precipitation of a portion of the dissolved solids and forms a mixture of water and floc. The polymeric coagulation enhancing agent preferably comprises an anionic polyacrylamide, such materials being commercially available for the purpose. If desired, the pH of in the final settler can be adjusted to near neutral by the addition of acid, for example, HCl, at 30.

The settled coagulants are removed via a draw from a bottom of the mixer/settler and the at least one settler and any accumulated particles in the skimmer-settler are also removed by a bottom draw. For compactness, a pump for removing these materials can be positioned beneath the skimmer-settler.

The just described method can be carried out in an apparatus comprising a skimmer-settler, an electrocoagulation unit receiving a middle draw from the skimmer-settler, a mixer-settler receiving output from the electrocoagulation unit, and at least one settler receiving overflow from the mixer-settler. A pump can be positioned beneath the skimmer-settler to move fluid from the skimmer-settler to the mixer-settler. A source 32 of basifying agent is preferably positioned to bring basifying agent together with the output of the electrocoagulation unit prior to or simultaneous with receipt of the output by the mixer-settler. A source 34 of coagulation enhancing agent is preferably positioned to bring coagulation enhancing agent together with the basified feed to the mixer-settler. A source 36 of acidifying agent can be positioned if desired to bring acidifying agent together with fluids in the final settler.

An in-line mixer 38 is preferably is positioned between the electrocoagulation unit and the mixer-settler. The basifying agent is preferably added between the electrocoagulation unit and the in-line mixer. The EC unit, the mixer, and the control valves 33, 37 and 35 for the basifying agent, acidifying agent, and coagulation agent respectively are all preferably positioned in a control room 40. The control room also preferably contains the power source for the EC unit, an AC unit, etc.

Each of the skimmer-settler, the mixer-settler and the at least one settler preferably comprises a tank having a lower pump out port for removing any collected precipitant and/or particles. A manifold 42 is preferably connected to each of the lower pump out ports. A pump 44 is coupled to manifold, and valving 46, 48, 50 and 52 is provided so that precipitant and/or particles in each of the tanks can be pumped out.

A stirrer 54 extends into the mixer-settler from an upper end of the mixer-settler generally along the longitudinal axis. The stirrer preferably has a fan-shaped impeller 56, and a variable speed driver 58 is provided for rotating the stirrer to pull fluid from the bottom of the mixer-settler.

Concerning the tanks forming the mixer-settler and settlers, preferably each has a generally cylindrical upper end portion and a lower end portion. The lower end portion has a sump and the lower pump out port opens into the sump. Each tank has a generally vertically positioned longitudinal axis and an inlet location and an outlet location at its upper end. The inlet of each tank is positioned to receive fluid flow by gravity from the outlet of the next adjacent upstream tank. A source of precipitating agent and a source of coagulating agent are in selective flow communication with the first tank.

In the apparatus, the electrocoagulation unit (ECU) coagulates residual oil, iron and heavy metals and kills microorganisms. It can be operated under conditions to produce a visible precipitate in the unit effluent with good results. The ECU is preferably operated so that dissolved iron in the effluent is below predetermined limits.

The ECU comprises a casing, a plate bundle, and a pair of electrodes. The plate bundle is positioned in the casing. The plate bundle comprises a plurality of spaced-apart parallel conductive plates. The electrodes are connected to the plates so that sequential plates are alternately connected to one of a first electrode of the pair or a second electrode of the pair and are uncontacted by the other electrode. The water flows between the plates and low-voltage current is supplied to the plates. Generally, DC current is used, supplied by a rectifier. The plates are generally constructed of iron or steel, although aluminum and/or magnesium can be used if desired. The ECU is very effective at reducing the dissolved iron content of the water, among other benefits.

The feed water stream flows between the plates to provide a residence time in the ECU in the range of 0.1 to 10 seconds and a potential in the range of 1 to 10 volts is maintained between the electrodes. The required potential depends on the conductivity of the water, less conductive water requiring voltage in the higher end of the range. For highly conductive water, and a treatment unit as described above, a potential in the range of 3-5 volts can be maintained between the electrodes and an electric current in the range of 200 to 400 amps is caused to flow between the electrodes.

The effluent from the ECU is mixed with caustic and a coagulating agent and circulated in a mixer-settler. The mixer-settler is preferably operated to separate out mostly Group II metals in a coagulated mineral form, as well as any oil, iron, heavy metals and bacteria coagulated by the electrocoagulation unit. The clarified effluent leaving the unit comprises water and chiefly soluble salts of Group I metals.

The coagulation enhancing agent added to the mixer settler generally comprises a polymeric substance. Several suitable types are known and are widely used. An aqueous solution of the coagulation enhancing agent is generally employed, for ease of metering. A preferred coagulation enhancing agent, which has been tested with good results, comprises an anionic polyacrylamide. It is preferably added to the mixer settler with stirring until jelly-like clumps of precipitant concentrate in the bottom of the mixer settler having a size of up to about an inch and the overflow going to the second tank contains only a small amount of visible precipitant or coagulant.

A clarified water stream is withdrawn from the last of the at least one settler. In the illustrated embodiment, two settlers are units, and the first is baffled in the same manner as the mixer/settler. If desired, salt or salt solution can be added to the clarified stream from the trailer-mounted treatment unit to achieve a fluid density desirable for further use in the oil and gas industry, for example, a density in the range of 9 to 11.5 pounds/gallon.

The clarified water stream exiting the final settler will often have a density in the range of 8.2 to about 9 pounds per gallon. The density can be raised by adding salt or salt solution selected from potassium chloride, sodium chloride, potassium bromide, sodium bromide, calcium chloride, calcium bromide, zinc bromide, and combinations thereof. Where the salt water density to be achieved is in the range of 8.3 to 9.7 pounds per gallon (ppg), the salt or salt solution can be potassium chloride. Where the salt water density to be achieved is in the range of 8.3 to 10 pounds per gallon (ppg), the salt or salt solution can be sodium chloride. Where the salt water density to be achieved is in the range of 8.3 to 11.6 ppg, the salt can be calcium chloride. Where the salt water density to be achieved is in the range of 8.3 to 15.2 ppg, calcium bromide can be used. Where the salt water density to be achieved is in the range of 8.3 to 19.2 pounds per gallon (ppg), the salt or salt solution can be zinc bromide. The added salt is generally selected on the basis of needed density and cost, although other properties may affect the salt which is ultimately selected.

A skimmer 9 collects and removes the oil from the skimmer-settler unit. Treatment in the electrocoagulator causes microorganism death and precipitation of iron. Treatment with a precipitating agent, particularly a base such as sodium hydroxide, reduces the calcium and barium content markedly. The clarified water is thus low in oil, low in calcium ion content, low in dissolved iron content, and low in living microorganism content.

Figure 3:
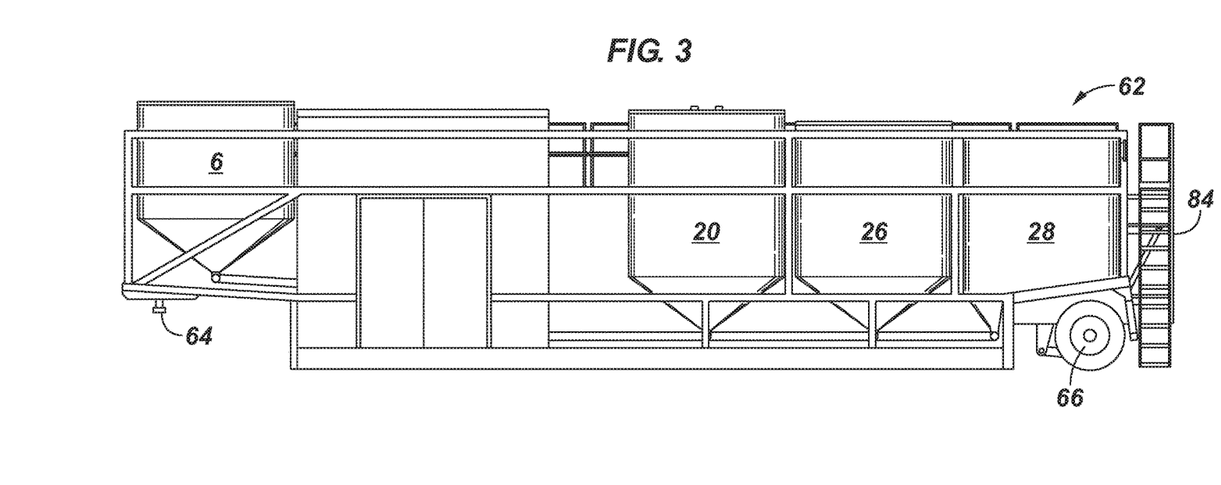
FIG. 3 is a driver's side view of a trailer according to an embodiment of the invention.
Figure 4:
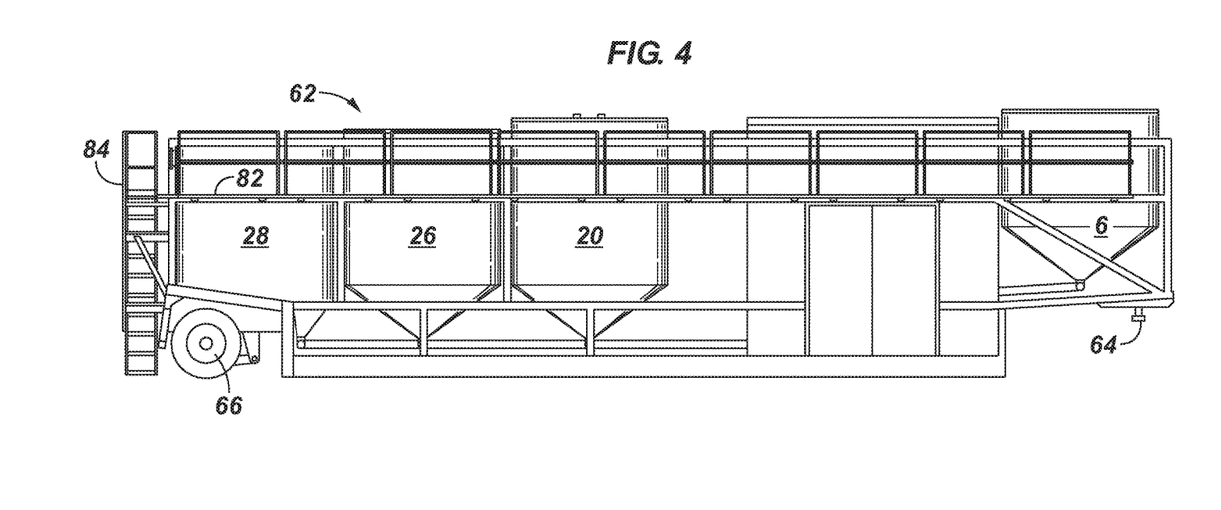
FIG. 4 is a are passenger's side view of the trailer of FIG. 3.

In another embodiment of the invention, there is provided an apparatus comprising a frame 60, preferably being part of a trailer 62, first, second and third upright tanks 20, 26, 28, an electrocoagulation unit 14, and a fourth tank 6 which is used as a skimmer separator unit.

For service in oil and gas field, the tanks are preferably sized to approach maximum trailer or skid capacity. Generally, each tank each has a capacity in the range of 20 to 200 barrels, preferably in the range of 50 to 150 barrels. This sizing permits a throughput in the range of 1,000 to 10,000 barrels/day per trailer or skid, depending on water quality, preferably in the range of 2,000 to 5,000 bbls/day.

In use, the trailer and tanks can have a weight in excess of 100,000 pounds. The apparatus therefore preferably further comprises a retractor (not shown) to raise the at least one axle so that the trailer rests on its frame. The retractor can simply be an air suspension system that has been deflated.

Figure 5:
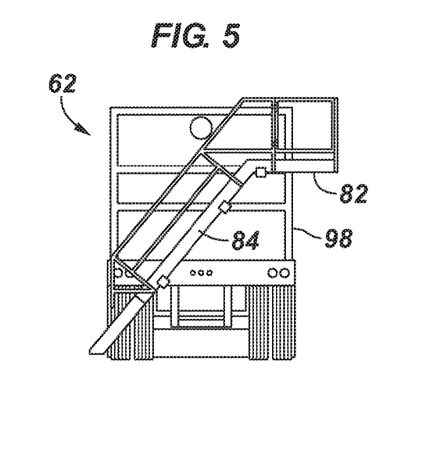
FIG. 5 is a back end view of the trailer of FIGS. 3 and 4.

The trailer has a front end and a back end with a fifth wheel coupler 64 at its front end and at least one axle assembly 66 with at least two wheels near the back end. Preferably, the trailer frame has at least one jack (not shown) near the front end to raise and lower the coupler. A first upright tank 20, a second upright tank 26, and a third upright tank 28 are mounted serially in a line on a top side of the trailer frame, with the third tank being positioned near the back end 68 of the trailer frame. A stirrer extends into the first tank from the upper end of the tank generally along the longitudinal axis. The stirrer has a fan-shaped screw impeller 56. A variable speed driver is connected to the stirrer, for rotating the stirrer to pull fluid from the bottom of the tank. The variable speed driver is mounted to the trailer frame by support means 70. A set of three parallel weir walls 72, 74, 76 is positioned in the first tank to divide the first tank into first and second downcomer sections and first and second riser sections. The second tank can also be provided with a set of three weir walls if desired. The first downcomer section is positioned nearest the front end of the trailer, the second riser section is positioned nearest the back end of the trailer, the first riser section is positioned adjacent to the first downcomer section and contains the fan-shaped impeller, and the second downcomer section is positioned between the first riser section and the second riser section. A wall forming the middle weir 74 has an upper end surface that is lower than a peripheral lip 80 defining the top of the first tank and a lower end surface that is spaced above the bottom of the first tank, so that fluid upwells centrally in the first riser section, spills over the upper end of the middle weir wall and flows through the second downcomer to the bottom of the tank. A portion of the fluid changes direction and flows upwardly in the second riser section and flows into the second tank. Particles and coagulant tend to continue in their downward direction and recirculate in the first tank. Each tank has an inlet and an outlet near the upper end of the tank. The inlet faces the front end of the trailer frame and outlet faces the back end of the trailer frame. The outlet of the first tank is in flow communication with the inlet of the second tank, and the outlet of the second tank is in flow communication with the inlet of the third tank. The outlet of the first tank is positioned higher than the inlet to a second tank, and the outlet of the second tank is positioned higher than the inlet to the third tank, so that fluid will flow by gravity from the first tank to the second tank to the third tank. The fourth tank is positioned at the front end of the trailer and contains an oil skimmer. A control room is positioned between the fourth tank and the first tank and the electrocoagulation unit is positioned in the control room. The electrocoagulation unit is positioned to draw from the fourth tank and to discharge though a flow path to the first tank. An inline mixer is also positioned in the control room in the flow path between the electrocoagulation unit and the first tank.

A catwalk 82 is mounted to the trailer frame 60. The catwalk extends longitudinally with respect to a longitudinal axis of the trailer frame alongside the tanks to permit visual inspection of the tank interiors. The catwalk floor is preferably positioned beneath the lip of the tanks.

Figure 6:
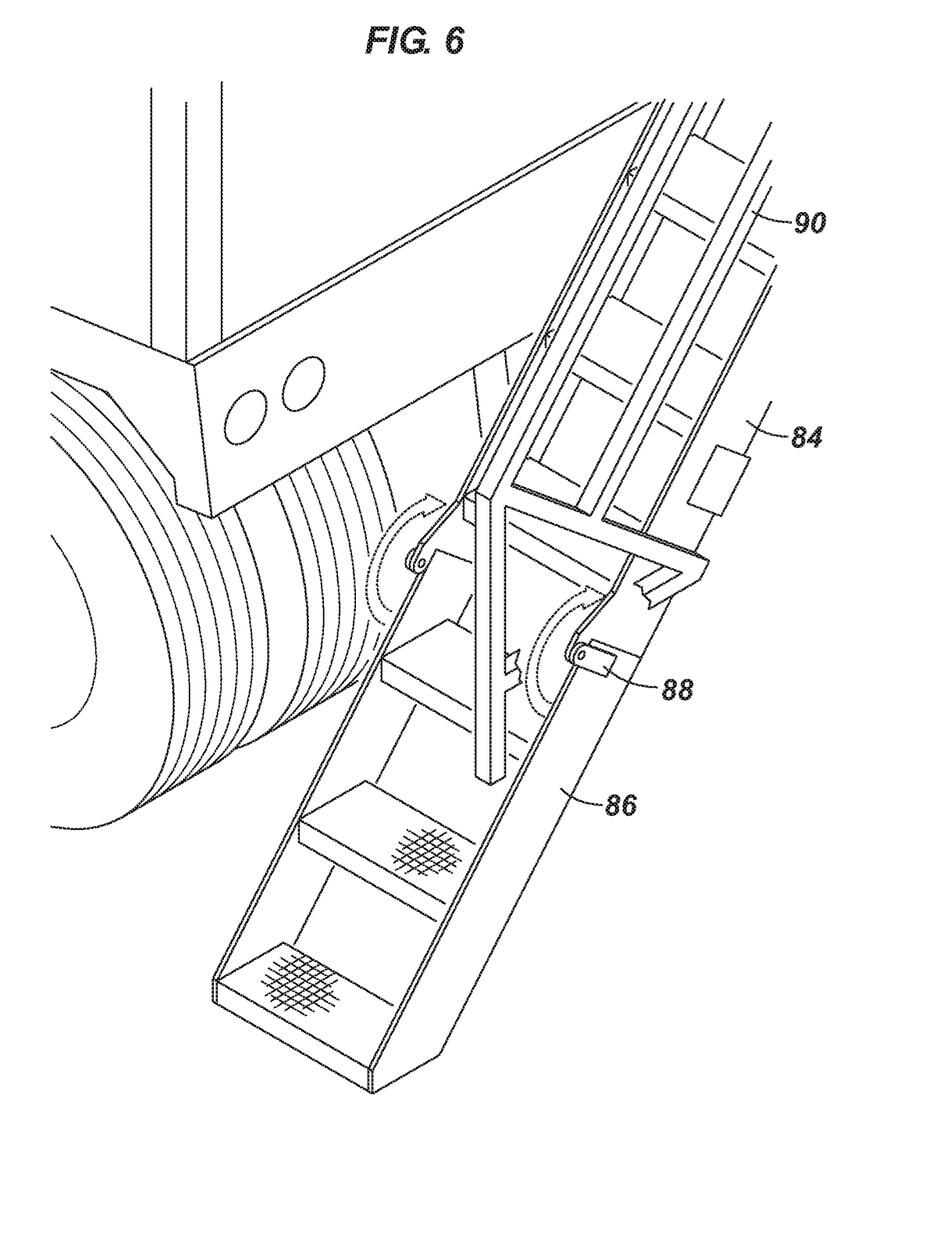
FIG. 6 is a detailed view of a lower portion of the trailer shown in FIG. 5.
Figure 7:
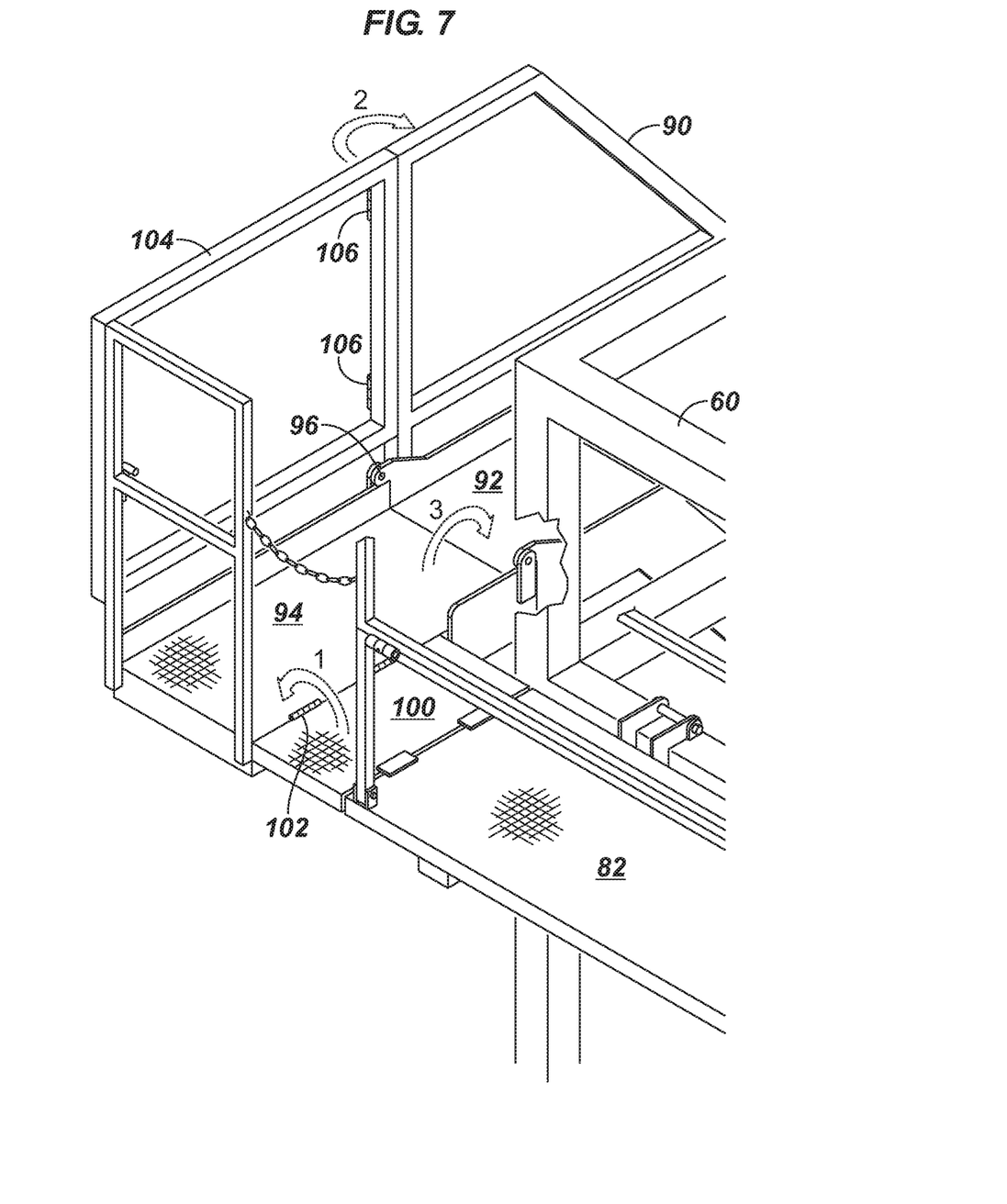
FIG. 7 is a detailed view of an upper portion of the trailer shown in FIGS. 4 and 5.

To provide easy and safe access to the catwalk, the trailer is in one embodiment is provided with a diagonally extending stairway 84 at the back end. The stairway extends in a direction which lies in a plane normal to the longitudinal axis of the trailer. It has a lowermost extension 86 hingedly connected at 88 to a main section to permit movement from a storage position wherein the extension rests on an upper surface of the main section for safe transportation to a deployed position wherein a lowermost step on the extension is positioned near the earth, as shown by the arrows FIG. 6. The stairway is preferably provided with a handrail 90 extending upwardly along an outside edge of the stairway. A horizontal landing 92 is provided at an upper end of the stairway. A landing extension 94 is hingedly connected at 96 to an end of the landing and extends horizontally laterally beyond a side 98 of the trailer when in a deployed configuration to form a laterally extending a walkway. A trap-door 100 is hingedly connected at 102 to a side edge of the landing extension to form a horizontally longitudinally extending walkway when in a deployed condition. The trap-door is foldable to lie flat on top of the landing extension and the landing extension is foldable to lie on top of the landing for storage and transport, as shown by arrows in FIG. 7. Preferably, a handrail extension 104 is hingedly connected at 106 to an upper end of the handrail 90. The handrail extension, when in a deployed configuration, extends upwardly from an edge and an end of the landing extension 94, and when in a stored condition, is folded against a portion of the handrail 90 so as to not extend laterally from a side of the trailer.

Figure 8:
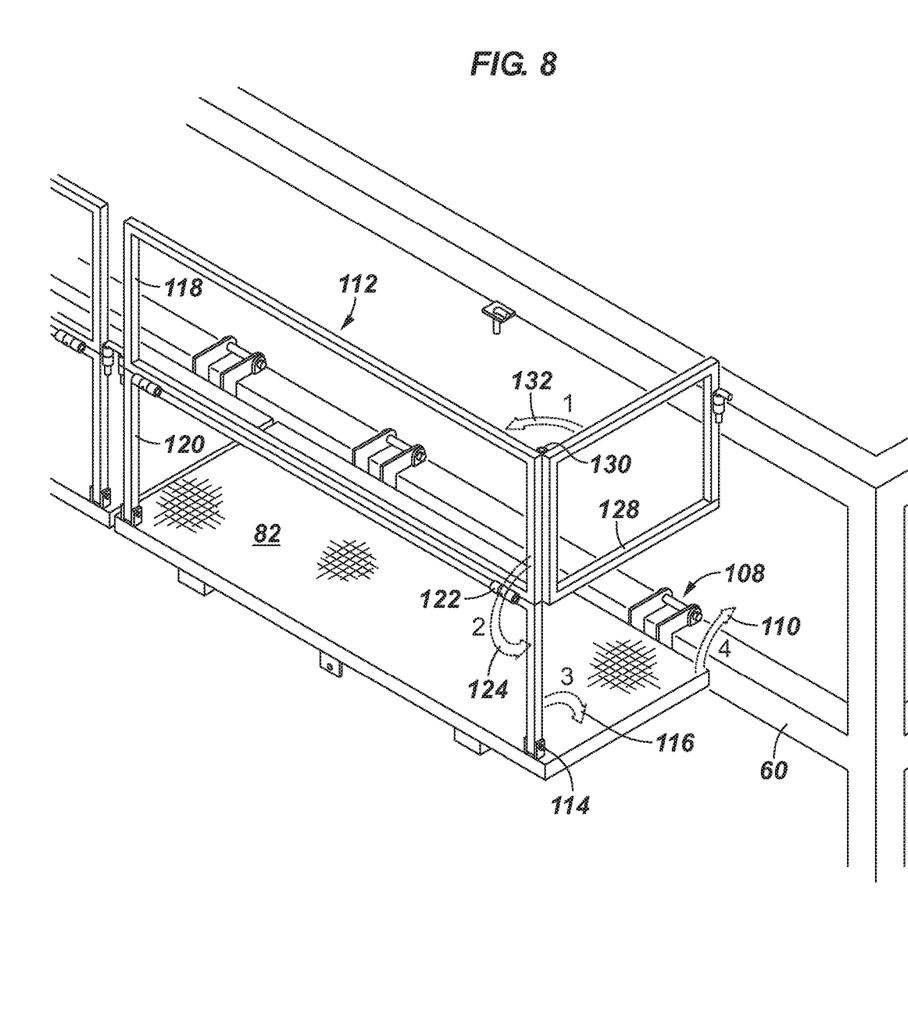
FIG. 8 is a detailed view of an upper portion of the trailer shown in FIG. 4.

With reference to FIG. 8, in one embodiment of the invention the trailer is provided with a frame 60 and the catwalk 82 is hingedly connected to the frame at 108 and extends longitudinally from the back end to near the front end of the trailer. The catwalk, when in a deployed position, extends generally horizontally laterally outwardly from the longitudinal axis of the trailer. The catwalk comprises a walkway having an inner edge and an outer edge and is hingedly connected to the frame along its inner edge. The catwalk is foldable into a stored position alongside the frame as indicated by arrow 110. When stowed, the walkway is positioned in a generally vertical plane. The catwalk further comprises a handrail 112 extending upwardly when in a deployed configuration from along an outer edge of the walkway. The handrail is hingedly connected at 114 to the walkway and is foldable to lie flat on an upper surface of the walkway for storage as indicated by arrow 116. In a preferred embodiment, the handrail has an upper section 118 and a lower section 120 when in the deployed configuration, hingedly connected at 122, so that the upper section folds flat against the lower section for storage as indicated by arrow 124. The upper section of the handrail preferably folds outwardly and downwardly as illustrated. The catwalk preferably has a front end gate 128 near the front end of the trailer hingedly connected at 130 to a front end of the handrail. The front end gate preferably opens inwardly and lies flat against the handrail for storage, as indicated by arrow 132.

While certain preferred embodiments have been described herein, the invention is not to be construed as being so limited, except to the extent that such limitations are found in the claims.

What is claimed is:

1. Apparatus comprising a trailer frame having a front end and a back end, said trailer having a fifth wheel coupler at its front end and at least one axle with at least two wheels at the back end;

said trailer frame having at least one jack to raise and lower the coupler;

a first upright tank, a second upright tank, and a third upright tank mounted serially in a line on a top side of the trailer frame, said line extending from the back end toward the front end of the trailer, the third tank being positioned at the back end of the trailer frame, a stirrer extending into the first tank from the upper end of the first tank, said stirrer having a fan-shaped screw impeller, a variable speed driver for the stirrer, for rotating the stirrer to pull fluid from the bottom of the first tank, said variable speed driver being mounted to the trailer frame by a support bracket, a set of three parallel weir walls positioned in the first tank, to divide the first tank into a first and a second downcomer section and a first and a second riser section, the first downcomer section being positioned nearest the front end of the trailer, the second riser section being positioned nearest the back end of the trailer, the first riser section being positioned adjacent to the first downcomer section and containing the fan-shaped impeller, and the second downcomer section being positioned between the first riser section and the second riser section, wherein a middle weir wall has an upper end surface that is lower than a peripheral lip defining the top of the first tank and a lower end surface that is spaced above the bottom of the first tank, so that fluid upwells centrally in the first riser section, spills over the upper end of the middle weir wall and flows through the second downcomer to the bottom of the first tank, wherein each tank has an inlet and an outlet at the upper end of each tank, the inlet facing the front end of the trailer frame, the outlet facing the back end of the trailer frame, the outlet of the first tank being in flow communication with the inlet of the second tank, and the outlet of the second tank being in flow communication with the inlet of the third tank, wherein the outlet of the first tank is positioned higher than the inlet to the second tank, and the outlet of the second tank is positioned higher than the inlet to the third tank, so that fluid will flow by gravity from the first tank to the second tank to the third tank, a fourth tank positioned at the front end of the trailer, said fourth tank containing an oil skimmer, a control room positioned between the fourth tank and the first tank, an electrocoagulation unit in the control room, said electrocoagulation unit positioned to draw from the fourth tank and to discharge though a flow path to the first tank, and an inline mixer positioned in the control room in the flow path between the electrocoagulation unit and the first tank.

2. Apparatus as in claim 1, further comprising a source of precipitating agent in selective flow communication with the flow path to the first tank, between the electrocoagulation unit and the inline mixer, a source of coagulating agent in selective flow communication with the first tank, and a vacuum pump in selective flow communication with the bottom end of each of the first, second, third and fourth tanks.

3. Apparatus as in claim 1 wherein each of the first, second, third and fourth tanks is cylindrically shaped, having an upper end and a bottom end, with a sump at its bottom end.

4. Apparatus as in claim 1 further comprising a catwalk mounted to the trailer frame, said catwalk extending longitudinally with respect to a longitudinal axis of the trailer frame alongside the first, second, third and fourth tanks to permit visual inspection of the tank interiors.

5. Apparatus as in claim 1, further comprising a diagonally extending stairway at the back end.

6. Apparatus as in claim 5 wherein the diagonally extending stairway has a lowermost extension hingedly connected to a main section to permit movement from a storage position wherein the extension rests on an upper surface of the main section for safe transportation to a deployed position.

7. Apparatus as in claim 5 further comprising a horizontal landing at an upper end of the stairway.

8. Apparatus as in 7 further comprising a landing extension hingedly connected to an end of said landing, said landing extension extending laterally beyond a side of the trailer when in a deployed configuration to form a laterally extending walkway.

9. Apparatus as in claim 8 further comprising a trap-door hingedly connected to a side edge of the landing extension to form a horizontally extending walkway when in a deployed condition.

10. Apparatus as in claim 9 wherein the trap-door is foldable to lie flat on top of the landing extension and the landing extension is foldable to lie on top of the landing for storage and transport.

11. Apparatus as in claim 1 further comprising a catwalk hingedly connected to the trailer frame and extending longitudinally from the back end to the front end of the trailer and, when in a deployed position, extending laterally outwardly from the longitudinal axis of the trailer.

12. Apparatus as in claim 11 wherein the catwalk comprises a walkway having an inner edge and an outer edge, said walkway being hingedly connected to the trailer frame along its inner edge and foldable into a stored position alongside the trailer frame.

13. Apparatus as in claim 12 wherein the catwalk further comprises a handrail extending upwardly when in a deployed configuration from along an outer edge of the walkway, said handrail being hingedly connected to the walkway and foldable to lie flat on an upper surface of the walkway for storage.

14. Apparatus as in claim 13 wherein the handrail has an upper section and a lower section when in the deployed configuration, hingedly connected, so that the upper section folds flat against the lower section for storage.

\* \* \* \* \*